United States Patent
Shah et al.

(10) Patent No.: US 9,584,850 B2
(45) Date of Patent: *Feb. 28, 2017

(54) CHANNEL SCANNING

(71) Applicant: ARRIS Enterprises, Inc., Suwanee, GA (US)

(72) Inventors: Punit Shah, Lawrenceville, GA (US); Derek Alan Winters, Suwanee, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,266

(22) Filed: Jan. 25, 2016

(65) Prior Publication Data

US 2016/0142759 A1 May 19, 2016

Related U.S. Application Data

(63) Continuation of application No. 14/194,910, filed on Mar. 3, 2014, now Pat. No. 9,277,161, which is a
(Continued)

(51) Int. Cl.

| | |
|---|---|
| *H04H 60/32* | (2008.01) |
| *H04N 21/426* | (2011.01) |
| *H04H 20/78* | (2008.01) |
| *H04B 10/2575* | (2013.01) |
| *H04L 12/28* | (2006.01) |
| *H04N 5/455* | (2006.01) |
| *H04N 21/647* | (2011.01) |
| *H04N 21/438* | (2011.01) |
| *H04N 21/61* | (2011.01) |

(52) U.S. Cl.
CPC . *H04N 21/42676* (2013.01); *H04B 10/25751* (2013.01); *H04H 20/78* (2013.01); *H04L 12/2885* (2013.01); *H04N 5/455* (2013.01); *H04N 21/426* (2013.01); *H04N 21/4263* (2013.01); *H04N 21/4382* (2013.01); *H04N 21/4383* (2013.01); *H04N 21/6118* (2013.01); *H04N 21/64738* (2013.01); *H04N 2201/04768* (2013.01)

(58) Field of Classification Search
CPC ............................................. H04N 2201/04768
USPC ................................ 725/15, 17, 95; 348/731
See application file for complete search history.

(56) References Cited

U.S. PATENT DOCUMENTS

| | | | | |
|---|---|---|---|---|
| 4,901,307 A | * | 2/1990 | Gilhousen | H04B 7/2041 370/320 |
| 5,513,176 A | * | 4/1996 | Dean | H01Q 21/29 343/844 |

(Continued)

*Primary Examiner* — Pankaj Kumar
*Assistant Examiner* — Sahar Baig
(74) *Attorney, Agent, or Firm* — Stewart M. Wiener

(57) ABSTRACT

Methods, systems, and apparatus can provide channel scanning. In various examples, a channel scanning module can instruct scanning of multiple channels within a wideband frequency range by assigning channels to demodulators to attempt to lock onto a signal at the assigned channel. In other examples, a channel scanning module can instruct scanning for downstream channels by assigning channels to multiple narrowband tuners and multiple demodulators to attempt to lock onto a signal on the assigned channel.

19 Claims, 5 Drawing Sheets

Related U.S. Application Data continuation of application No. 12/859,828, filed on Aug. 20, 2010, now Pat. No. 8,667,522.

(60) Provisional application No. 61/237,043, filed on Aug. 26, 2009.

(56) References Cited

U.S. PATENT DOCUMENTS

| | | | | |
|---|---|---|---|---|
| 5,541,955 | A * | 7/1996 | Jacobsmeyer | H03D 3/241 375/222 |
| 5,793,759 | A * | 8/1998 | Rakib | H04B 1/707 348/E7.07 |
| 5,809,060 | A * | 9/1998 | Cafarella | H04B 1/707 375/146 |
| 6,115,080 | A | 9/2000 | Reitmeier | |
| 6,359,923 | B1 * | 3/2002 | Agee | H04B 1/69 370/342 |
| 2004/0228175 | A1 | 11/2004 | Candelore et al. | |
| 2007/0201504 | A1 | 8/2007 | Christensen et al. | |
| 2008/0170853 | A1 | 7/2008 | Rakib et al. | |
| 2008/0240214 | A1 | 10/2008 | Dapper et al. | |
| 2008/0278634 | A1 | 11/2008 | Huang et al. | |
| 2009/0077457 | A1 | 3/2009 | Ramesh et al. | |
| 2010/0003915 | A1 | 1/2010 | Shamain et al. | |

* cited by examiner

CHANNEL SCANNING

CROSS REFERENCE TO RELATED APPLICATION

This application is a continuation patent application claiming the benefit of U.S. patent application Ser. No. 14/194,910, entitled "Improved Channel Scanning," filed on Mar. 3, 2014, which is hereby incorporated herein by reference in its entirety. U.S. patent application Ser. No. 14/194,910 is a continuation application claiming the benefit of U.S. patent application Ser. No. 12/859,828, entitled "Improved Channel Scanning," which was filed on Aug. 20, 2010, the entirety of which is hereby incorporated by reference. U.S. patent application Ser. No. 12/859,828 is a non-provisional application claiming the benefit of U.S. Provisional Application Ser. No. 61/237,043, entitled "Improved Channel Scanning," which was filed on Aug. 26, 2009, the entirety of which is hereby incorporated by reference.

TECHNICAL FIELD

This disclosure relates to scanning channels.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

In transporting downstream multimedia content, as well as data, upstream messages are typically sent to request the content and to set up a service flow to deliver the content. In addition to downstream multimedia content, such as video, voice traffic also uses message signaling to set up service flows for the upstream and downstream directions.

These signals are typically sent over a fiber network to a location, sometimes referred to as a node, near an end user, and from the node to a broadband user device via a coaxial cable. Such an arrangement is known in the art as a hybrid fiber coax network (HFC).

Typically, when a device is initially connected to the network, the device goes through an initialization process. The initialization process can include scanning the channels to identify downstream channels driven by a headend. Once a downstream channel is identified, the device performs ranging and registration processes to join the HFC network.

BRIEF DESCRIPTION OF THE DRAWINGS

Like reference numbers and designations in the various drawings indicate like elements.

DETAILED DESCRIPTION

In some implementations of this disclosure, systems and methods can operate to use tuners at multiple frequencies to enhance identification of downstream frequencies for use in ranging and registration of devices. For example, in a wideband system, a wideband tuner can be used to select a wide range of frequencies to capture. Multiple demodulators can be used on the channels within that wide range of frequencies to determine whether lock can be achieved on any of those channels. In a narrowband example, multiple narrowband tuners can be included in the device with multiple demodulators. The narrowband tuners can be set to selected frequencies corresponding to downstream channels. After the local oscillators associated with the tuners have settled, demodulators associated with the tuners can be used to determine whether lock can be achieved at any of the selected frequencies. New frequencies can be selected for the set of narrowband tuners until demodulator lock and ranging and registration are successfully achieved.

Figure 1:
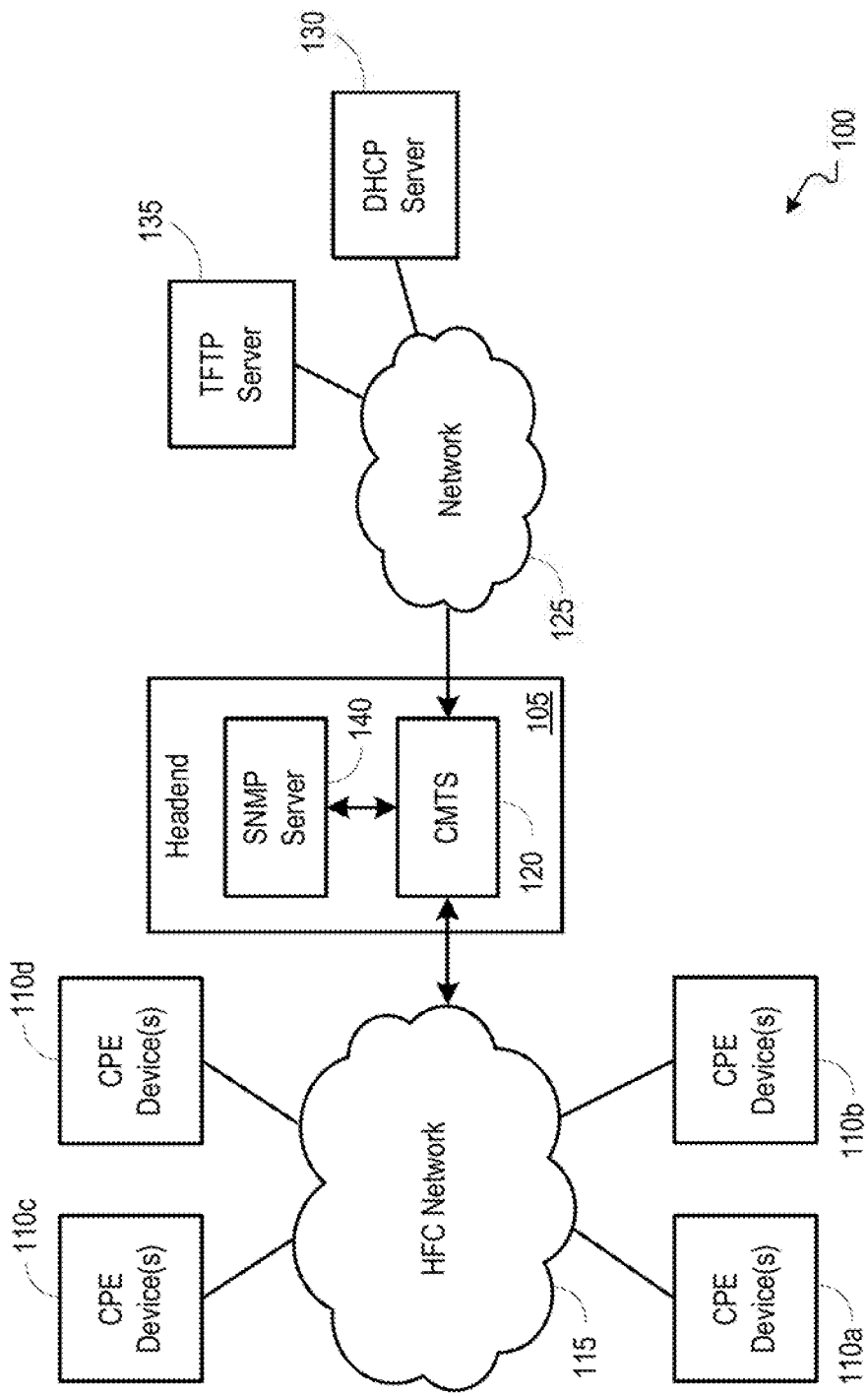
FIG. 1 is a block diagram illustrating an example network environment operable to provide multiple demodulator frequency scanning.

FIG. 1 is a block diagram illustrating an example network environment operable to provide multiple demodulator channel scanning. In some implementations, a headend 105 can provide video, data and/or voice service(s) to customer premise equipment (CPE) devices 110a-d in one or more subscriber groups (e.g., service group(s)) through a hybrid fiber-coax (HFC) network 115. The headend 105 can include devices such as a cable modem termination system (CMTS) 120 and/or an edge quadrature amplitude modulation (EQAM) device, or a combined device including multiple edge and/or video or data processing functionalities. Such devices can operate to facilitate communications between a network 125 and the CPE device 110a-d. In various implementations, the network 125 can include one or more networks internal to the headend and/or one or more networks external to the headend (e.g., one or more extranets, the Internet, etc.).

Data services can be handled by the headend 105 through a CMTS 120. The CMTS 120 can receive data signals from external device(s) or nodes through network(s) 125. The network(s) 125, for example, can operate using Internet protocol (IP), sending data packets to and receiving data packets from the headend 105. In some examples, the CMTS 120 can be paired with a SIP proxy server (not shown) operable to provide voice over internet protocol (VoIP) services with voice connectivity to other subscribers or voice connectivity to a public switched telephone network (PSTN) (not shown). In still further examples, one or more video sources 150 may provide streaming data through the network(s) 125 to the CMTS 120

In some implementations, the CMTS 120 can forward packets destined for subscribers to an EQAM device used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more CPE devices 110a-d via the hybrid fiber-coax (HFC) network 115. In other implementations, the CMTS 120 can modulate a baseband signal to a carrier wave and transmit the signal to a combiner for upconversion to a transmission frequency.

When a CPE device 110a-d initially attempts connect to the headend 105, the device 110a-d goes through frequency scanning, ranging and registration processes with the headend 105. The frequency scanning process is operable to facilitate identification of a downstream frequency that can be used for ranging and registration process.

In wideband implementations, a CPE device 110a-d can include one or more wideband tuners operable to facilitate receipt of signals over a wide frequency range. In such implementations, the CPE device 110a-d can further include multiple demodulators (e.g., four demodulators). After a local oscillator associated with the one or more wideband tuners settles at a selected wideband frequency, the multiple demodulators can attempt to lock onto a downstream signal at selected frequencies (e.g., four selected frequencies). Use of the multiple demodulators and/or multiple wideband tuners can decrease the time used to achieve lock on the downstream signal. However, it should be noted that use of a single wideband tuner and a single demodulator can also increase a scan rate when the wideband tuner is not reset every time the demodulator attempts to lock on a new frequency (e.g., the demodulator scans through multiple channels in a bandwidth currently being tuned by the wideband tuner before setting the wideband tuner on a new frequency). In such implementations, the demodulator is not waiting for the tuner to settle on every channel, and thus can more quickly cycle through the channels. It should also be understood that selection of the wideband frequency can be made according to any algorithm for selecting candidate frequency ranges for scanning. Similarly, the order in which sub-frequency ranges within the wideband frequency range are selected for scanning can be based upon any scanning algorithm. For example, certain channels (e.g., frequencies) may be preferred by various MSOs, and such channels can be scanned prior to scanning non-preferred channels. For example, a channel scanning algorithm can scan from lowest channel to highest channel, from highest channel to lowest channel, or any other order programmed into a channel scanning module (i.e., may be stored in a memory). The channel scanning algorithm can scan in the order of most common use, or even based on scanning first the channels having the highest signal energy.

In narrowband implementations, a CPE device 110a-d can include a multiple tuners (e.g., four tuners), each tuner being operable to facilitate receipt of signals in a selected frequency range. In such implementations, the CPE device 110a-d can further include multiple demodulators (e.g., four demodulators). After local oscillators associated with the narrowband tuners settle in the selected frequency ranges, the multiple demodulators can attempt to lock onto a downstream signal at the selected frequencies. Use of the multiple demodulators can decrease the time used to achieve lock on the downstream signal. The order in which the narrow band frequency ranges are selected for scanning can be based upon any scanning algorithm. For example, certain channels (e.g., frequencies) may be preferred by various MSOs, and such channels can be scanned prior to scanning of non-preferred channels. For example, a channel scanning algorithm can scan from lowest channel to highest channel, from highest channel to lowest channel, or any other order programmed into a channel scanning module (i.e., may be stored in a memory). The channel scanning algorithm can scan in the order of most common use, or even based on scanning first the channels having the highest signal energy.

The ranging process typically includes sending a ranging request to a CMTS system. The CPE can gradually increase the power of the ranging request until a response has been received from the CMTS. Upon receipt of the ranging request, the CMTS can analyze the power, frequency and timing of the request received from the CPE and responds with a range response (RNG-RSP), typically instructing the modem to adjust its transmit power, frequency and/or timing.

The registration process typically includes retrieval of a configuration filename from a dynamic host control protocol (DHCP) server 130 through the network 125. Upon receipt of the configuration filename, the CPE device 110a-d identifies a trivial file transfer protocol (TFTP) server 135 where the configuration file is stored. The CPE device 110a-d then requests the configuration file from the TFTP server 135 using the filename provided by the DHCP server. Upon receiving the configuration file, the CPE device 110a-d registers with the CMTS 120.

It should be understood that the ranging and registration processes are described in the DOCSIS standards (e.g., DOCSIS 1.0, 1.1 and 2.0 in the Radio Frequency Interface (RFI) specification, and DOCSIS 3.0 Physical Layer (PHY) specification and MAC and Upper Layer Protocols Interface (MULPI) specification, each of which are hereby incorporated by reference in their entirety), and are well known in the industry. Thus, this disclosure only describes these processes generally. For a more complete description, reference may be made to the DOCSIS standards, and more particularly to the RFI specification, which is separated into the PHY specification and MULPI specification in DOCSIS 3.0.

Figure 2:
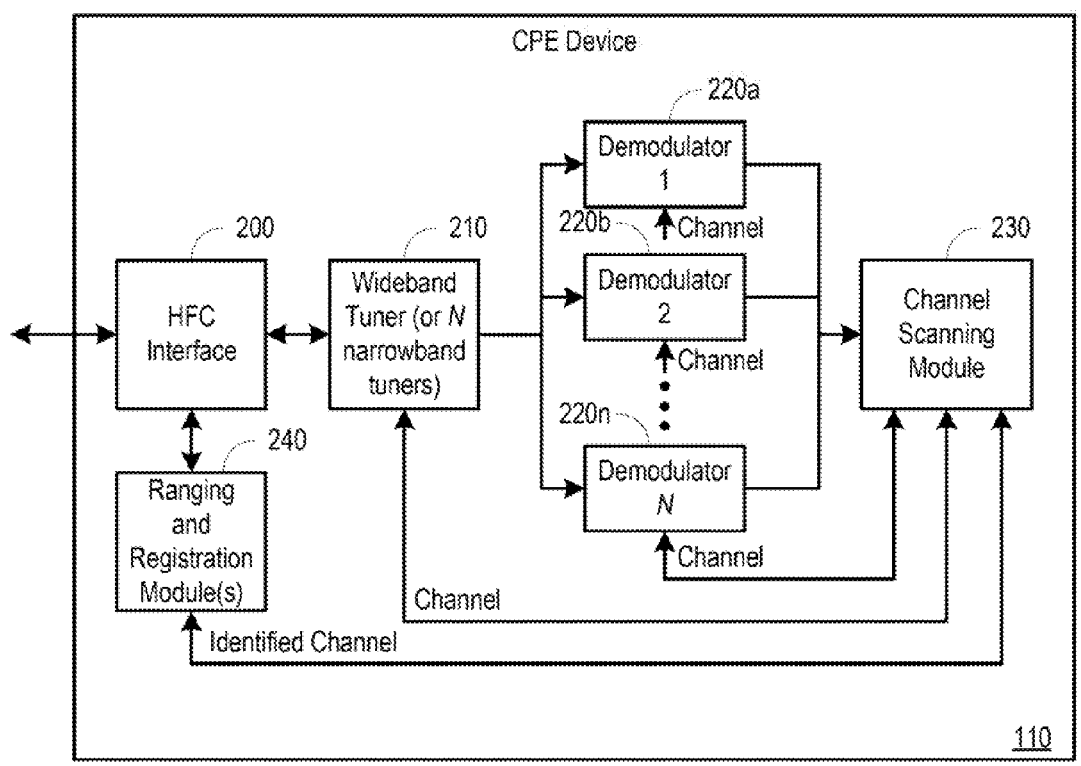
FIG. 2 is a block diagram illustrating a multiple demodulator frequency scanning device.

FIG. 2 is a block diagram illustrating a CPE device 110 with multiple demodulator channel scanning. The device 110 can include an HFC network interface 200. The HFC network interface can facilitate receipt and transmission of communications via the HFC network. Downstream signals can be received from a headend CMTS via the HFC network, and upstream signals can be sent to the headend CMTS via the HFC network.

The CPE device 110 can also include a wideband tuner 210. The wideband tuner 210 can receive the signals via the HFC network interface 200. In some implementations, the wideband tuner 210 can tune to a range of frequencies from the HFC network. The range of frequencies to which the wideband tuner 210 can tune can vary based upon the bandwidth associated with the tuner 210. The bandwidth associated with the wideband tuner 210 can include multiple DOCSIS channels.

The CPE device 110 can also include multiple demodulators 220a-n. The demodulators can take the waveform produced by the tuner and produce a data stream. DOCSIS identifies a demodulator 220a-n as achieving channel lock when a program identifier (PID) for DOCSIS is identified within the data stream and five consecutive packets with a correct cyclic redundancy check (CRC) are received. In some implementations, an MPEG transport stream can be split into a DOCSIS stream and a proprietary stream. Thus, the demodulator can also be identified as achieving channel lock when a DOCSIS PID or a proprietary PID is received with five consecutive packets having a correct CRC field. Once the downstream channel is identified and locked onto, the CPE device 110 can read the downstream packets to obtain an upstream channel descriptor (UCD).

The CPE device 110 can also include a channel scanning module 230. The channel scanning module 230 can provide instructions to the demodulators 220a-n identifying which of the channels in the wideband frequency range the demodulators 220a-n should use to attempt to lock onto a downstream signal. In some implementations, the channel scanning module 230 can be programmed with a channel scanning algorithm operable to select the order in which the channels are scanned in an attempt to lock onto a downstream signal to obtain a universal channel descriptor. For example, certain channels (e.g., frequencies) may be preferred by various MSOs, and such channels can be scanned prior to scanning non-preferred channels. For example, a channel scanning algorithm can scan from lowest channel to highest channel, from highest channel to lowest channel, or any other order programmed into the channel scanning module 230 (i.e., may be stored in a memory). The channel scanning algorithm can scan in the order of most common use, or even based on scanning first the channels having the highest signal energy. After attempting to lock onto a signal for a predetermined period of time, the channel scanning module 230 can provide instructions including a new set of channels with which the demodulators 220a-n can attempt to lock on a downstream signal to obtain a UCD message.

The channel scanning module 230 can also provide instructions to the wideband tuner 210. The instructions can identify a wideband frequency range to which the wideband tuner 210 can tune. In some implementations, the channel scanning module 230 can be programmed with a channel scanning algorithm operable to select the order in which the wideband frequencies are selected for the demodulators to attempt to lock onto the downstream signal to obtain a UCD message.

While the above disclosure describes channels in terms of frequency-based channels, it should be understood that the disclosed multiple demodulator channel scanning system can also be used to scan different types of channels. For example, the channel may describe a code-based channel. In such examples, the demodulators 220a-n can receive the same signal and can scan through a set of codes to identify a code-based channel by modifying the teachings outlined above.

Figure 3:
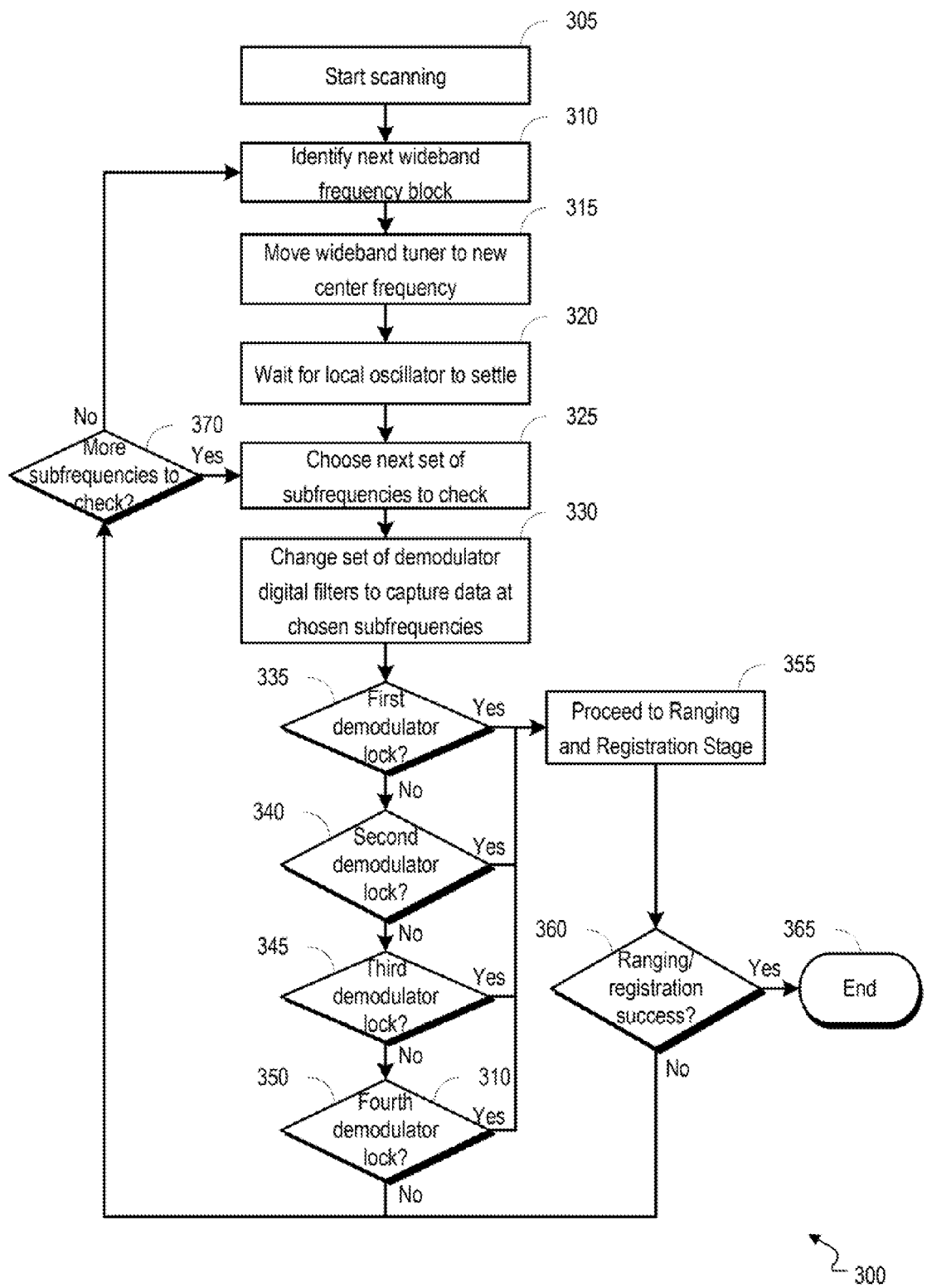
FIG. 3 is a flowchart illustrating an example process for using a wideband tuner to scan and lock onto frequencies for ranging and registration.

FIG. 3 is a flowchart illustrating an example process 300 for using a wideband tuner to scan and lock onto channels for ranging and registration. At stage 305, scanning is started. Scanning can be started, for example, by a channel scanner (e.g., channel scanning module 230 of FIG. 2), in conjunction with a tuner (e.g., wideband tuner 210 of FIG. 2) and multiple demodulators (e.g., demodulators 220a-n of FIG. 2). In some implementations, the scanning is started upon power up of a CPE device (or other network device) when joining the HFC network.

At stage 310, a next wideband frequency block is identified. The next wideband frequency block can be identified, for example, by a channel scanner (e.g., channel scanning module 230 of FIG. 2). In some implementations, the channel scanner can implement an algorithm that intelligently scans a channel space. For example, the channel scanner algorithm might bias the selection of wideband frequency blocks to encompass channels which may be used more regularly as downstream channels by headend systems. The wideband frequency block, in various implementations, can be a rough multiple of the frequency width of a channel. As an example, an upper limit frequency might be 1000 MHz and the wideband tuner can have a capture bandwidth (CBW) of 100 MHz. A wideband frequency block might be, for example, the range of 900-1000 MHz. The wideband frequency block of 100 MHz can have approximately 16 DOCSIS channels. It should also be noted, that the number of channels in the wideband frequency block can be a multiple of the number of demodulators used in the system, thereby achieving efficient use of the demodulators provided by the device.

At stage 315, the wideband tuner is moved to the identified wideband frequency block. For example, the wideband tuner can be moved to, for example, a center frequency of 950 MHz for the identified wideband frequency block 900-1000 MHz. The wideband tuner can be moved to the identified wideband frequency block, for example, by a channel scanner (e.g., channel scanning module 230 of FIG. 2) in conjunction with a wideband tuner (e.g., wideband tuner 210 of FIG. 2).

At stage 320, settling time for the local oscillator is provided. Settling time for the local oscillator can be provided, for example, by a wideband tuner (e.g., wideband tuner 210 of FIG. 2). The settling time, in various implementations, can vary based upon the wideband tuner and generally describes the amount of time used by the wideband tuner before a uniform waveform is provided by the local oscillator. The local oscillator can be used to facilitate tuning of the wideband signal.

At stage 325, a next set of subfreqeuncies is identified. After the wideband tuner has been set at the center frequency (for example, of 950 MHz) and the local oscillators (LOs) have settled, frequencies inside this block of 100 MHz (900-1000 MHz), which can also be referred to as subfrequencies or channels, can be identified. The next set of channels can be identified, for example, by a channel scanner (e.g., channel scanning module 230 of FIG. 2). The channel scanner can use a frequency selection module to identify channels to scan. In some implementations, the identification of channels can be weighted to provide preference to channels that are more likely to be used as downstream channels.

At stage 330, digital filters associated with a set of demodulators are adjusted to capture data at the identified channels. The adjustment of digital filters associated with a set of demodulators to capture data at identified channels can be provided, for example, by a channel scanner (e.g., channel scanning module 230 of FIG. 2) in conjunction with demodulators (e.g., demodulators 220a-n of FIG. 2).

At stages 335-350, each of four demodulators is checked to determine whether the demodulators have achieved lock onto a signal. The determination of whether the demodulators have achieved lock onto a signal can be made, for example, by a demodulator (e.g., demodulators 220a-n of FIG. 2) in conjunction with a channel scanner (e.g., channel scanning module 230 of FIG. 2). Although shown in series in FIG. 3, in other implementations, the determinations of whether signal lock has been achieved by any of the demodulators can be made in parallel.

If signal lock has been achieved in any of stages 335-350, the process 300 proceeds to perform ranging and registration at stage 355. Ranging and registration can be performed, for example, by ranging and registration modules (e.g., ranging and registration module(s) 240 of FIG. 2) in conjunction with a channel scanner (e.g., channel scanning module 230 of FIG. 2).

A determination is then made at stage 360 whether ranging and registration is successful. The determination can be made, for example, by ranging and registration modules (e.g., ranging and registration module(s) 240 of FIG. 2). In some implementations, the ranging and registration is successful when a headend responds to a ranging request, and a subsequent registration request is made to the headend system, e.g., after retrieving a configuration file from a trivial file transfer protocol (TFTP) server and using the configuration file to register with the headend. The process 300 then proceeds to end at stage 365. While FIG. 2 shows an example process in which the process proceeds to ranging and registration of one channel at a time until a successful ranging and registration occurs, in other implementations ranging and registration requests can be sent to the headend after a determination has been made for all frequencies in which signal lock had been achieved by one or more of the multiple demodulators. The headend can allow registration for any one of those frequencies.

Returning to stages 335-350, if a determination is made that none of the demodulators achieve signal lock on the identified downstream channels, a determination is made whether there are more channels within the wideband frequency block at stage 370. The determination of whether there are more channels within the wideband frequency block can be made, for example, by a channel scanner (e.g., channel scanning module 230 of FIG. 2). If there are more channels in the wideband frequency block, the process 300 proceeds to stage 325 where the next set of channels to be used by the demodulators are identified. Alternatively, if there are no more channels in the wideband frequency block, the process proceeds to stage 310, where a next wideband frequency block is identified.

Returning to stage 360, if a determination is made that the ranging and registration stages are not successful, the process can proceed to stage 370 where it is determined whether there are further channels in the wideband frequency block to analyze. The process 300 can thereby continue until a downstream channel is identified and ranging and registration on the channel are successful. It should be understood that in some implementations, the channel scan process can be interrupted after a period of time during which no successful connection is established.

Figure 4:
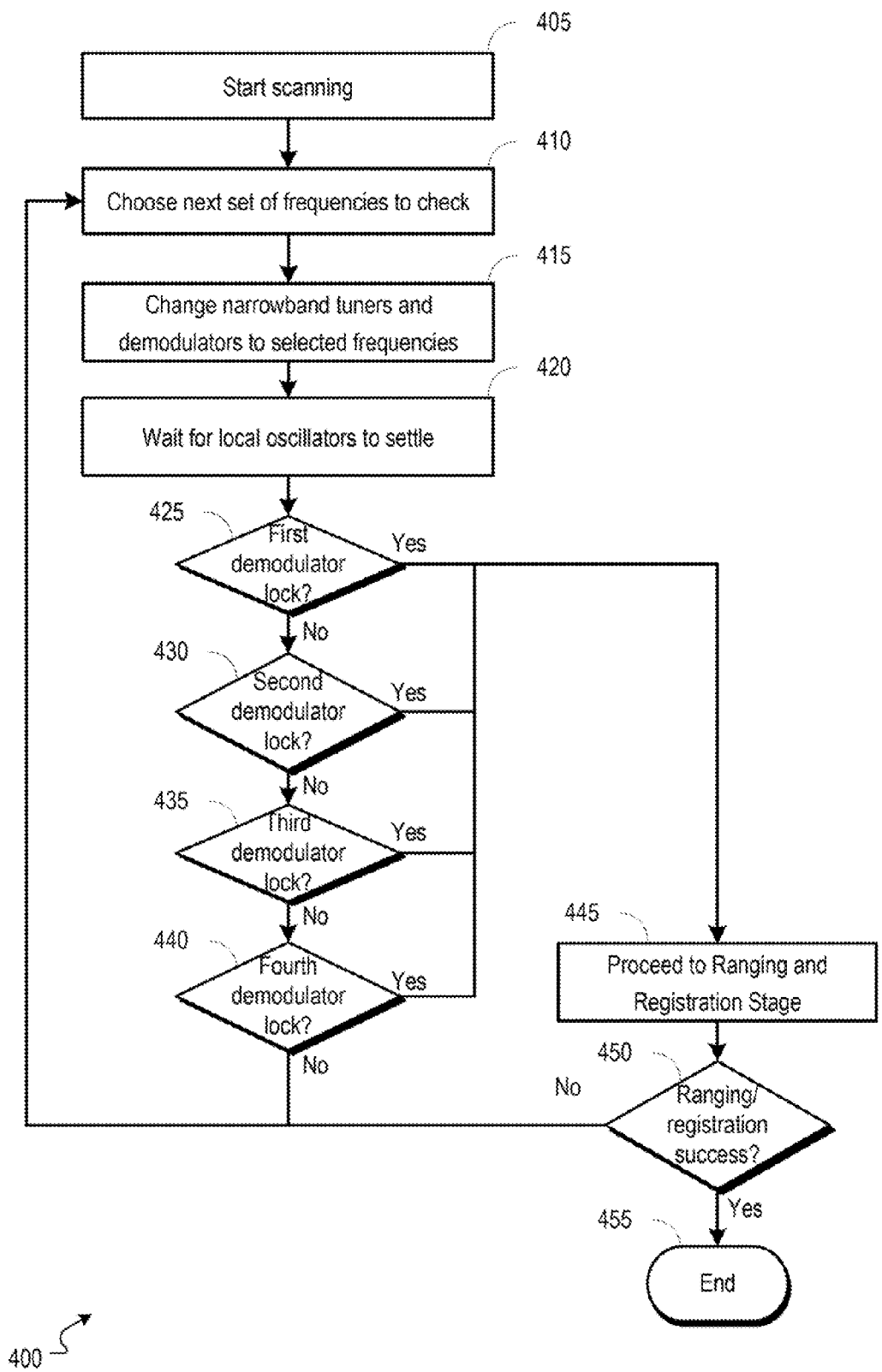
FIG. 4 is a flowchart illustrating an example process for using a narrowband tuner to scan and lock onto frequencies for ranging and registration.

FIG. 4 is a flowchart illustrating an example process for using a narrowband tuner to scan and lock onto frequencies for ranging and registration. The process 400 begins at stage 405. Scanning can be started, for example, by a channel scanner (e.g., channel scanning module 230 of FIG. 2), in conjunction with a tuner (e.g., narrowband tuners 210 of FIG. 2) and multiple demodulators (e.g., demodulators 220a-n of FIG. 2). In some implementations, the scanning is started upon power up of a CPE device (or other network device) when joining the HFC network.

At stage 410 a next set of channels to check is identified. The next set of channels to check can be identified, for example, by a channel scanner (e.g., channel scanning module 230 of FIG. 2). In some implementations, the channel scanner can implement an algorithm that intelligently scans a channel space. For example, the channel scanner algorithm might bias the selection of channels to provide preference to channels which may be used more regularly as downstream channels by headend systems.

At stage 415, the narrowband tuners and demodulators are moved to the identified channels. The narrowband tuners can be moved to the identified channels, for example, by a channel scanner (e.g., channel scanning module 230 of FIG. 2) in conjunction with narrowband tuners (e.g., narrowband tuners 210 of FIG. 2).

At stage 420, settling time for the local oscillators is provided. Settling time for the local oscillator can be provided, for example, by narrowband tuners (e.g., narrowband tuners 210 of FIG. 2). The settling time, in various implementations, can vary based upon the wideband tuner and generally describes the amount of time used by the wideband tuner before a uniform waveform is provided by the local oscillator. The local oscillator can be used to facilitate tuning of the wideband signal.

At stages 425-440, each of four demodulators is checked to determine whether the demodulators have achieved lock onto a signal. The determination of whether the demodulators have achieved lock onto a signal can be made, for example, by a demodulator (e.g., demodulators 220a-n of FIG. 2) in conjunction with a channel scanner (e.g., channel scanning module 230 of FIG. 2). Although shown in series in FIG. 4, in other implementations, the determinations of whether signal lock has been achieved by any of the demodulators can be made in parallel.

If frequency lock is achieved by any of the demodulators, the process proceeds to stage 445 where ranging and registration processes are performed. The ranging and registration processes can be performed, for example, by ranging and registration modules (e.g., ranging and registration module(s) 240 of FIG. 2) in conjunction with a channel scanner (e.g., channel scanning module 230 of FIG. 2).

A determination is then made at stage 450 whether ranging and registration is successful. The determination can be made, for example, by ranging and registration modules (e.g., ranging and registration module(s) 240 of FIG. 2). In some implementations, the ranging and registration is successful when a headend responds to a ranging request, and a subsequent registration request is made to the headend system, e.g., after retrieving a configuration file from a trivial file transfer protocol (TFTP) server and using the configuration file to register with the headend. The process 400 then proceeds to end at stage 455.

Returning to stages 425-440, if a determination is made that none of the demodulators achieve signal lock on the identified downstream channels, the process returns to stage 410, where a next set of channels to check are identified. Similarly, returning to stage 450, if a determination is made that the ranging and registration stages are not successful, the process 400 can proceed to stage 410, where a next set of channels to check are identified.

Figure 5:
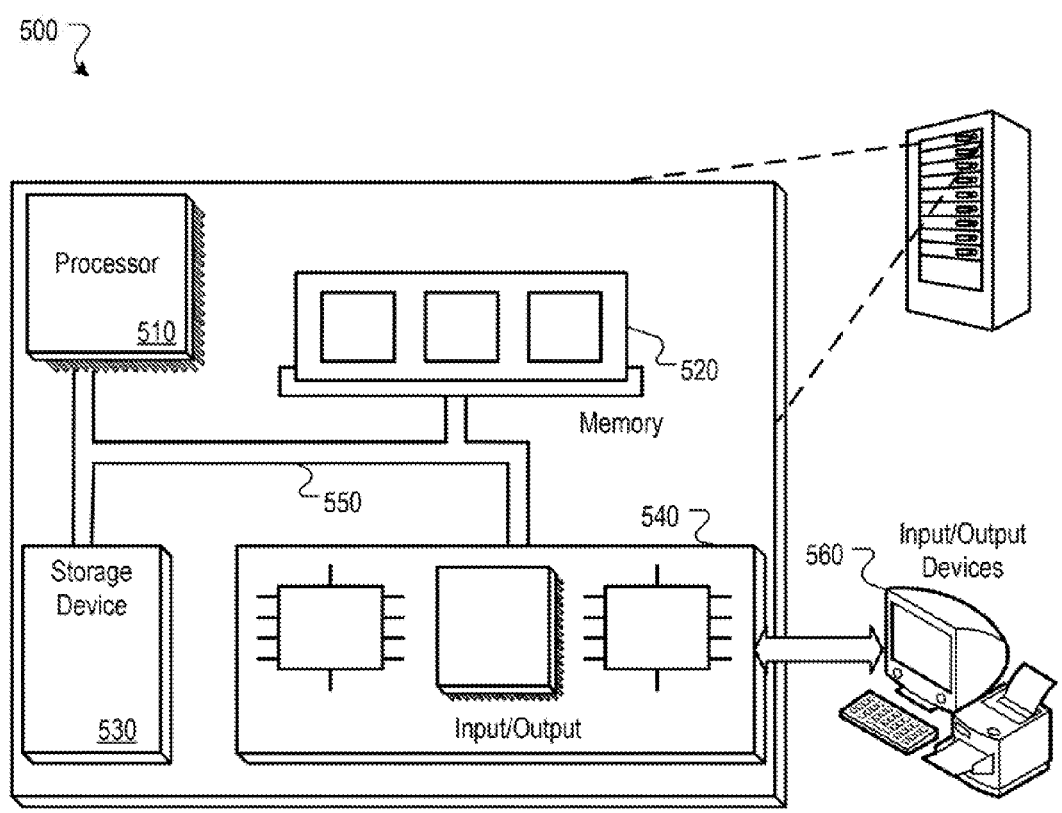
FIG. 5 is a block diagram of a customer premise device providing multiple demodulators for scanning frequencies.

FIG. 5 is a block diagram of a customer premise device providing multiple demodulators for scanning frequencies. The multiple demodulator channel scanning device 500 can include a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the device 500. In one implementation, the memory 520 is a computer-readable medium. In one implementation, the memory 520 is a volatile memory unit. In another implementation, the memory 520 is a non-volatile memory unit.

In some implementations, the storage device 530 is capable of providing mass storage for the device 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the device 500. In one implementation, the input/output device 540 can include one or more of a wireless interface, HFC network interface, such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The multiple demodulator channel scanning device (e.g., a CPE device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for channel scanning comprising:
   receiving a downstream network signal;
   identifying a first wideband frequency block in the network signal;
   identifying a number of demodulators available in a communications device;
   identifying a plurality of subfrequencies within the first wideband frequency block, wherein the plurality of subfrequencies identified matches a number of available demodulators;
   for each respective one subfrequency of the identified plurality of subfrequencies, attempting to lock onto the respective one subfrequency with a respective one demodulator of the available demodulators, wherein the individual processes of attempting to lock onto each of the identified plurality of subfrequencies occur in parallel to each other;
   identifying a first subfrequency from the identified plurality of subfrequencies on which one of the number of demodulators has achieved lock; and
   performing ranging and registration for the first subfrequency if demodulator lock has been achieved for the first subfrequency by one or more of the demodulators.

2. The method of claim 1, wherein demodulator lock has been achieved for the first subfrequency when five consecutive packets with a correct forward error correction check within a data stream for the first subfrequency are received.

3. The method of claim 1, wherein identifying the plurality of subfrequencies is performed using a scanning algorithm.

4. The method of claim 3, wherein the scanning algorithm comprises going through the subfrequencies in order.

5. The method of claim 4, wherein the order comprises going from lowest subfrequency to highest subfrequency.

6. The method of claim 4, wherein the order comprises going from highest subfrequency to lowest subfrequency.

7. The method of claim 3, wherein the scanning algorithm comprises going through the frequencies in the order of most common use.

8. The method of claim 3, wherein the scanning algorithm comprises going through the frequencies beginning with the frequencies stored in a memory.

9. The method of claim 3, wherein the scanning algorithm comprises going through the frequencies beginning with the subfrequencies having the highest signal energy.

10. The method of claim 1, further comprising:
    identifying a second wideband frequency block in the network signal if no first subfrequency has been identified for any subfrequency in the first wideband frequency block;
    identifying a second plurality of subfrequencies within the second wideband frequency block for the number of demodulators to attempt to lock, wherein the plurality of subfrequencies identified matches the number of demodulators available;
    attempting to lock onto each of the identified second plurality of subfrequencies within the second wideband frequency block with a respective demodulator, wherein the individual processes of attempting to lock onto each of the identified second plurality of subfrequencies occur in parallel to each other;
    identifying the first subfrequency from the identified plurality of subfrequencies on which one of the number of demodulators has achieved lock; and
    performing ranging and registration for the first subfrequency within the second wideband frequency block if demodulator lock has been achieved for the first subfrequency within the second wideband frequency block.

11. The method of claim 1, further comprising:
    identifying a second wideband frequency block in the network signal if ranging and registration was unsuccessful for the identified first subfrequency in the first wideband frequency block;
    identifying a second plurality of subfrequencies within the second wideband frequency block for the number of demodulators to attempt to lock, wherein the plurality of subfrequencies identified matches the number of demodulators available;
    attempting to lock onto each of the identified second plurality of subfrequencies within the second wideband frequency block with a respective demodulator, wherein the individual processes of attempting to lock onto each of the identified second plurality of subfrequencies occur in parallel to each other; and
    identifying a second subfrequency from the identified second plurality of subfrequencies on which one of the number of demodulators has achieved lock; and
    performing ranging and registration for the second subfrequency within the second wideband frequency block if demodulator lock has been achieved for the second subfrequency within the second wideband frequency block.

12. A method for channel scanning comprising:
    receiving a downstream network signal;
    identifying a first wideband frequency block in the network signal;
    identifying a first plurality of n subfrequencies within the first wideband frequency block for a plurality of n demodulators to attempt to lock;
    attempting to lock onto the plurality of n subfrequencies with respective demodulators from the plurality of n demodulators to identify a data signal within one of the plurality of n subfrequencies; and
    recursively performing ranging and registration for all subfrequencies from the plurality of subfrequencies for which lock was achieved by any of the plurality of demodulators acting in parallel.

13. The method of claim 12, further comprising:
identifying a second wideband frequency block in the network signal if no lock has been achieved on any of the first plurality of n subfrequencies in the first wideband frequency block;
identifying a second plurality of n subfrequencies within the second wideband frequency block for a plurality of n demodulators to attempt to lock;
attempting to lock onto the second plurality of n subfrequencies within the second wideband frequency block with the plurality of n demodulators; and
performing ranging and registration for one or more second subfrequencies from the second plurality of n subfrequencies within the second wideband frequency block if one or more of the plurality of n demodulators has achieved lock for the one or more second subfrequencies from the second plurality of n subfrequencies within the second wideband frequency block.

14. The method of claim 12, further comprising:
identifying a second wideband frequency block in the network signal if ranging and registration was unsuccessful for all of the first plurality of n subfrequencies;
identifying a second plurality of n subfrequencies within the second wideband frequency block for the plurality of n demodulators to attempt to lock;
attempting to lock onto the second plurality of n subfrequencies within the second wideband frequency block with the plurality of n demodulators; and
performing ranging and registration for all subfrequencies within the second wideband frequency block for which demodulator lock has been achieved within the second plurality of n subfrequencies within the second wideband frequency block.

15. The method of claim 12, wherein demodulator lock has been achieved for any of the first plurality of n subfrequencies when five consecutive packets with a correct forward error correction check within the data stream for any of the first plurality of n subfrequencies are received.

16. A cable modem, comprising:
a communications interface operable to receive a downstream network signal;
a wideband tuner operable to receive identification of a first wideband frequency block in the network signal;
a processor operable to identify the first wideband frequency block for the wideband tuner and to identify a first plurality of subfrequencies within the first wideband frequency block for a demodulator to attempt to lock;
a plurality of demodulators operable to receive identification of the first plurality of subfrequencies in the wideband frequency block and to attempt to lock onto the plurality of subfrequencies to identify a data signal within one of the plurality of subfrequencies; and
the processor being further operable to recursively perform ranging and registration processes for all subfrequencies from the first plurality of subfrequencies for which lock was achieved by any of the plurality of demodulators acting in parallel.

17. The cable modem of claim 16, further comprising:
the processor being further operable to identify a second wideband frequency block in the network signal and to instruct the wideband tuner to tune to the second wideband frequency block if no lock has been achieved on any of the first plurality of subfrequencies in the first wideband frequency block, and the processor is operable to identify a second plurality of subfrequencies within the second wideband frequency block for the plurality of demodulators to attempt to lock;
the plurality of demodulators being operable to attempt to lock onto the second plurality of subfrequencies within the second wideband frequency block; and
the network processor is further operable to perform ranging and registration for one or more second subfrequencies from the second plurality of subfrequencies within the second wideband frequency block if one or more of the plurality of demodulators has achieved lock for the one or more second subfrequencies from the second plurality of subfrequencies within the second wideband frequency block.

18. The cable modem of claim 16, further comprising:
the processor being further operable to identify a second wideband frequency block in the network signal including identifying a second plurality of subfrequencies within the second wideband frequency block if ranging and registration was unsuccessful for all of the first plurality of subfrequencies;
the plurality of demodulators being operable to attempt to lock onto the second plurality of subfrequencies within the second wideband frequency block; and
the processor being further operable to perform ranging and registration processors for all subfrequencies within the second wideband frequency block for which demodulator lock has been achieved for the second plurality of subfrequencies within the second wideband frequency block.

19. The cable modem of claim 16, wherein the cable modem is integrated into a set top box or an embedded multimedia terminal adapter.

* * * * *